US006838671B2

United States Patent
Compana et al.

(10) Patent No.: US 6,838,671 B2
(45) Date of Patent: Jan. 4, 2005

(54) DEVICE AND METHOD FOR THE DETECTION OF BURIED OBJECTS

(75) Inventors: Stephen B. Compana, Doylestown, PA (US); Conrad W. Terrill, Lorton, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 142 days.

(21) Appl. No.: 10/121,291

(22) Filed: Apr. 12, 2002

(65) Prior Publication Data

US 2003/0193429 A1 Oct. 16, 2003

(51) Int. Cl.$^7$ ................................................. B64D 1/04
(52) U.S. Cl. ........................................ 250/349; 250/392
(58) Field of Search ................................. 250/349, 392, 250/366, 369, 367, 368; 89/1.13, 1.11; 86/50; 376/159, 154; 324/326, 329, 337; 348/155, 143; 701/23; 342/179, 24; 25/366

(56) References Cited

U.S. PATENT DOCUMENTS

| | | | | |
|---|---|---|---|---|
| 5,712,441 A | * | 1/1998 | Grunewald | 89/1.13 |
| 5,844,603 A | * | 12/1998 | Ogata | 348/155 |
| 5,903,680 A | * | 5/1999 | De Haan et al. | 382/265 |
| 6,026,135 A | * | 2/2000 | McFee et al. | 376/159 |
| 6,341,551 B1 | * | 1/2002 | Comeyne | 89/1.13 |
| 6,417,797 B1 | * | 7/2002 | Cousins et al. | 342/179 |
| 6,493,612 B1 | * | 12/2002 | Bisset et al. | 701/23 |

OTHER PUBLICATIONS

Aponte et al., "A Bayesian Approach to Multi–Sensor Fusion for Vehicle Mounted Mine Detection", SPIE Aero-Sense Conference 4394: Detection & Remediation Technologies for Mines and Minelike Targets, VI, Apr. 16, 2001.

McGovern et al., "Analysis of IR Signatures of Surface and Buried Anti–Tank Landmines", SPIE AeroSense Conference 4394: Detection & Remediation Technologies for Mines and Minelike Targets VI, Apr. 16, 2001.

Bishop et al., "Improved Close–In Detection for the Mine Hunter/Killer System", SPIE AeroSense Conference 4394: Detection & Remediation Technologies for Mines and Minelike Targets VI, Apr. 16, 2001.

Compana, et al., "Downward Looking Infrared for Vehicle Mounted Mine Detection", SPIE AeroSense Conference 4394: Detection & Remediation Technologies for Mines and Minelike Targets VI, Apr. 16, 2001.

* cited by examiner

*Primary Examiner*—Constantine Hannaher
*Assistant Examiner*—Otilia Gabor
(74) *Attorney, Agent, or Firm*—Tarolli, Sundheim, Covell & Tummino L.L.P.

(57) ABSTRACT

A device and method for detection of buried objects (40) utilizing a down looking infrared array (140) having infrared detectors (170) positioned in a sensor array (30). This sensor array (30) may also contain ground penetrating radar (70) and EMI coils (80). All signals from the ground penetrating radar (70), EMI coils (80) and down looking infrared array (140) may be combined to generate alarms (1100). However, the down looking infrared array (140) may be utilized as a sole means of detecting buried objects (40). This device and method for detecting buried objects (40) utilizing down looking infrared array (140) reduces the cost of construction and maintenance of such a device.

19 Claims, 7 Drawing Sheets

DEVICE AND METHOD FOR THE DETECTION OF BURIED OBJECTS

BACKGROUND OF THE INVENTION

1. Field of the Invention

This invention relates generally to a system and method for detection of buried objects. More particularly, this system and method utilizes down-looking infrared (DLIR) sensors with or without ground penetrating radar (GPR) and metal detectors (MD) to locate landmines buried beneath ground level.

2. Discussion of the Related Art

Today landmines have become an enormous problem for both military forces and civilian populations. Unlike the landmines utilized during World War II and before, today's landmines may not necessarily be made of metal that can be easily detected by metal detectors. Very often these landmines may be made of plastic or other materials that are difficult to differentiate from the surrounding soil or other naturally occurring phenomena. Further, in the case of antitank mines, these mines may be buried relatively deep in the to ground, such as six inches or more. These antitank landmines are designed and positioned in the ground so that the weight of a person would not activate the mine. However, the weight of a vehicle would in most cases set off the mine. Of course, setting off such an antitank mine may also be caused by a tractor plowing a field long after the war is over.

Therefore, the military and other agencies have long desired a mechanism by which buried landmines may be detected and neutralized. One such mechanism is illustrated in FIG. 1 and was known as the Close-In Detection (CID) System, developed under the Mine Hunter/Killer (MH/K) advanced technology demonstration program for the United States military by TRW and subcontractors to TRW. The CID System comprises a vehicle 10 on which a sensor array 30 is attached to the front thereof. This sensor array 30 would be mounted to vehicle 10 by hydraulic lifts and would contain metal detectors (MD) as well as ground penetrating radar (GPR). In addition, a forward-looking infrared (FLIR) camera 20 would be mounted to the top of the vehicle 10 and aimed to cover a trapezoidal area 50 in front of the vehicle 10 and sensor array 30. The FLIR 20 as well as sensor array 30 would detect objects 40 positioned below the ground 60. The information from both the sensor array 30 and FLIR 20 may be combined to identify objects 40. The design and operation of the CID System is further detailed in a paper presented in April, 2001 at the SPIE AeroSense Conference 4394: Detection & Remediation Technologies for Mines and Minelike Targets VI, by S. Bishop et al. entitled "Improved Close-In Detection for the Mine Hunter/Killer System", incorporated herein in its entirety by reference.

FIG. 2 is a top view of the CID System shown in FIG. 1 and also shows the FLIR field 50, vehicle 10 and sensor array 30. In addition, sensor array 30 is shown containing GPR 70 sensors and electromagnetic induction (EMI) coils 80 that act as metal detectors.

However, the CID System shown in FIGS. 1 and 2 has several drawbacks directly related to the FLIR 20. First, the FLIR 20 is a relatively expensive and complex piece of equipment due to the lens system and IR detectors contained therein. The FLIR 20 may cost as much as 50 percent or more of the cost of the vehicle 10 itself. Thus, repair and replacement of the FLIR 20 camera is also expensive. In addition, since the FLIR 20 camera views the FLIR field 50 in front of sensor array 30, the unification of the respective images to identify landmines located beneath ground 60 adds another layer of complexity to the system.

Still further, FIGS. 3A, 3B, and 3C are similar to the CID System shown in FIG. 1 with the exception that difficulties due to the usage of the FLIR 20 are more clearly illustrated. In FIG. 3A, a misalignment of FLIR 20 camera by as little as one degree will create a one foot placement error in the FLIR field 50 that would result in a one foot displacement of any buried objects 40 detected. Therefore, proper calibration of the FLIR 20 camera is absolutely essential for accurate identification of buried objects 40. Of course, in a military vehicle, such as vehicle 10, off road usage, or simply rough roads, will necessitate the frequent realignment of the FLIR 20 camera. This may be particular the case in an active combat area.

FIG. 3B further illustrates how a rough road having a bump as small as 2 and ¼ inches will cause a one-foot placement error in the FLIR field 50. Of course, a similar sized pothole would also generate a similar displacement error. Since bumps and potholes are frequent occurrences even in the best road systems, the accuracy of the FLIR 20 camera would be compromised.

FIG. 3C further indicates how a small rise in the road level may also generate a significant placement error. As indicated only a 4 and ½ rise can generate a one-foot placement error for objects 40 buried beneath ground 60.

FIG. 4 is an illustration of how reflected light from sky 65 may impact FLIR 20 camera. Depending upon the position of the sun and cloud patterns in sky 65, a reflection off of object 90 may be generated by sky 65. Depending on the weather conditions and whether the sun or moon is out, the object 90 may appear hotter or cooler to the FLIR 20 camera than would otherwise be detected relative to the ground 60. Therefore, the accuracy of the FLIR 20 camera is also comprised by weather conditions.

Therefore, what is needed is a device and method that will have the benefits of IR detection of landmines without the high cost of an FLIR camera. Further, these IR detectors should not require repeated or complex adjustments in order to operate properly and should not be affected by road or weather conditions.

BRIEF SUMMARY OF THE INVENTION

In accordance with the teachings of the present invention an embodiment is disclosed having a device for detecting buried objects. This device uses a sensor array comprised of discrete downward looking infrared detectors. A processor based system is connected to the sensor array to receive and analyze signals received from the downward looking infrared detectors and to generate alarms when the signals analyzed exceed a predetermined threshold indicative of a buried object.

A further embodiment of the present invention is a device to detect buried objects. This device has a sensor array having several downward looking infrared detectors, several EMI coils, and several ground penetrating radar sensors. A processor based system is connected to the sensor array to receive and analyze signals received from the downward looking infrared detectors, the EMI coils, and the ground penetrating radar sensors and to generate alarms when the signals analyzed exceed a predetermined threshold indicative of a buried object.

A still further embodiment of the present invention is a method of detecting buried objects. This method receives an image from several downward looking infrared detectors.

The image is then passed through a two-dimensional spatial high pass filter and a signal to noise ratio for the image is determined. The signal to noise ratio is compared to a predetermined threshold. The image is dilated and then shrunk to a single point at the center of the image. The single point is mapped to earth coordinates and an alarm is issued when a buried object is detected.

Additional objects, features and advantages of the present invention will become apparent from the following description and the appended claims when taken in connection with the accompanying drawings.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION OF THE INVENTION

Figure 1:
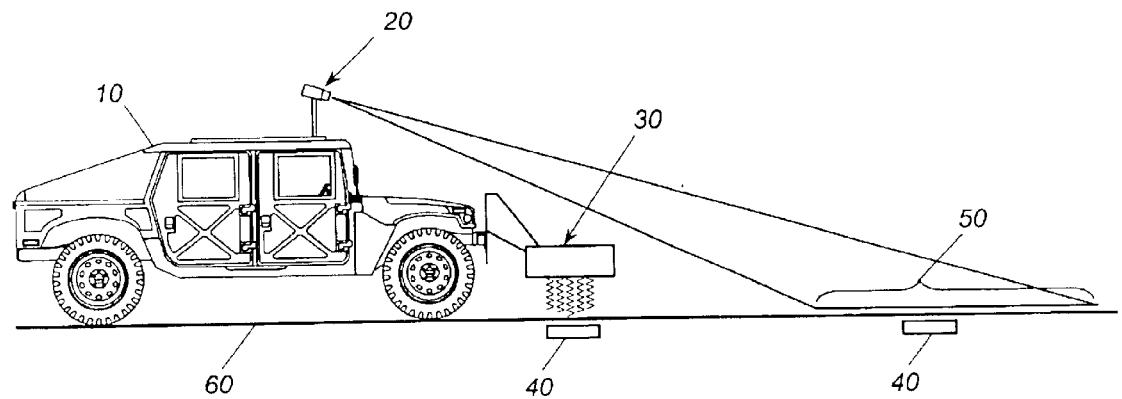
FIG. 1 is a side view of the Close-In Detection (CID) System vehicle utilizing a sensor array and a forward looking infrared (FLIR) camera.
Figure 2:
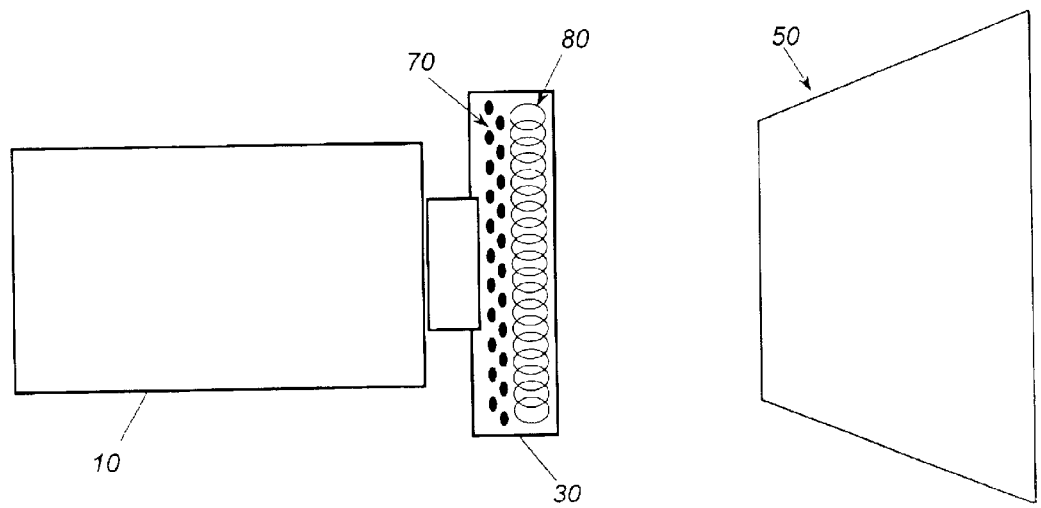
FIG. 2 is a top of the CID System vehicle shown in FIG. 1 with its associated FLIR field.
Figure 3A:
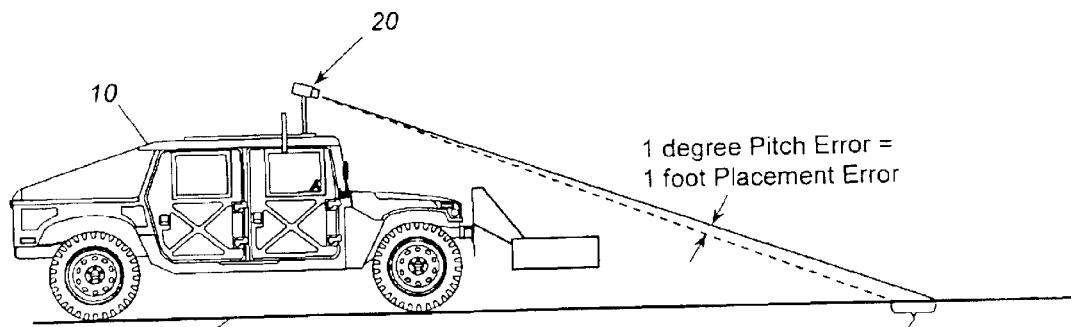
FIG. 3A is a side view diagram showing placement error due to improper adjustment of the FLIR camera.
Figure 3B:
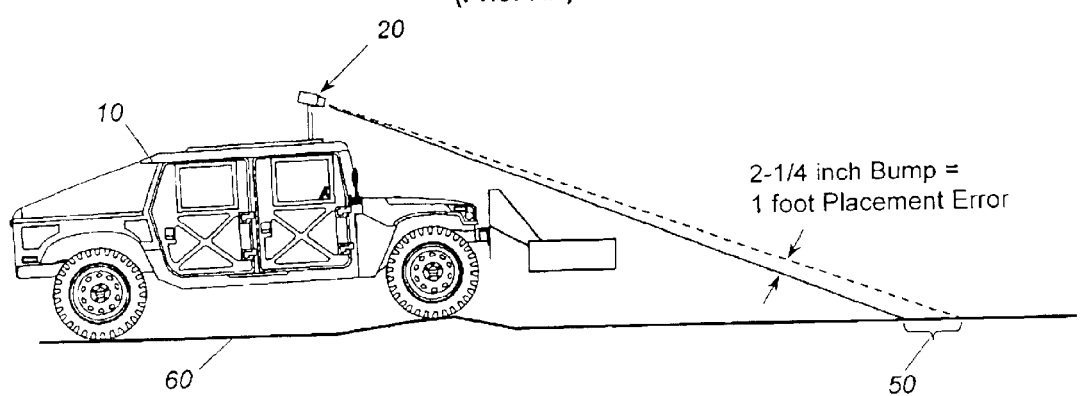
FIG. 3B is a side view diagram showing placement error in the FLIR camera due to an uneven road surface.
Figure 3C:
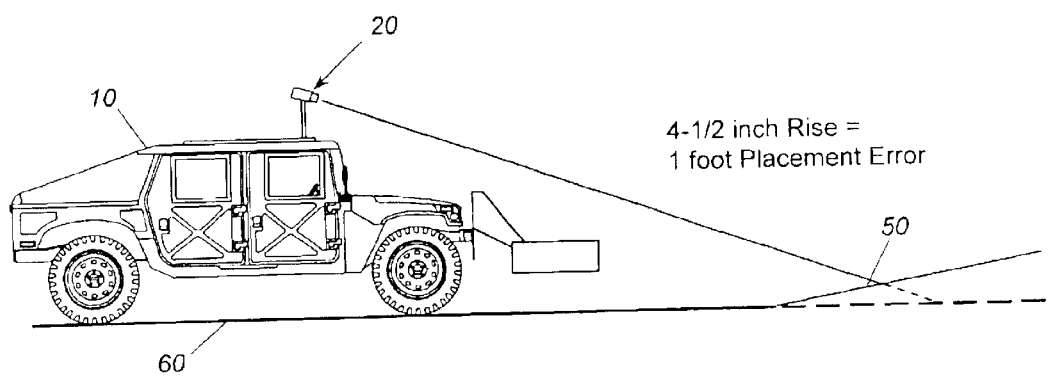
FIG. 3C is a side view diagram showing placement error in the FLIR camera due to a change in road elevation.
Figure 4:
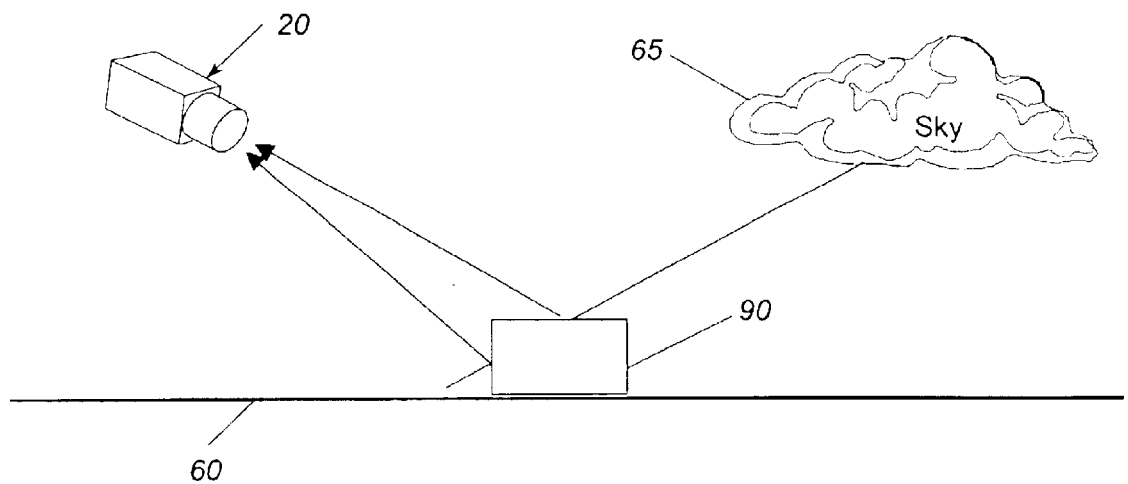
FIG. 4 is an illustration of how weather and cloud patterns may cause reflections that are detected by the FLIR camera.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

Figure 5:
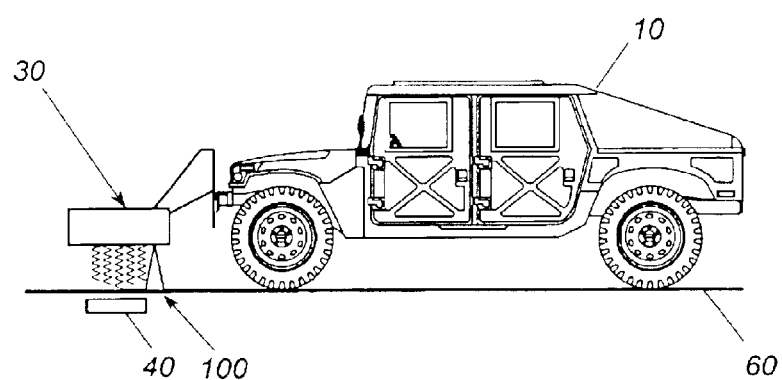
FIG. 5 is a side view diagram of a vehicle having a sensor array with a down looking infrared (DLIR) field projected in an example embodiment of the present invention.
Figure 7A:
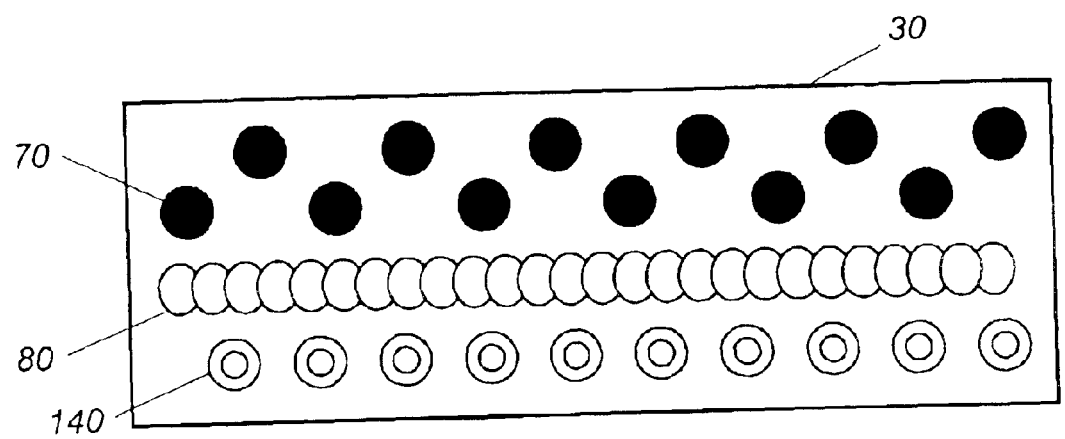
FIG. 7A is a bottom view of an example embodiment of the sensor array in the present invention.

FIG. 5 is a side view diagram of a vehicle having a sensor array 30 with a down looking infrared (DLIR) field 100 projected in an example embodiment of the present invention. DLIR detectors 140 and 150, further detailed in FIG. 7A through FIG. 8, are physically located on the undersigned of the sensor array 30. The sensor array 30 would be permanently affixed to vehicle 10 utilizing permanent supports or hydraulic lifts (not shown). As will be discussed further in FIGS. 7A, 78, and 7C, the sensor array may also contain GPR 70 sensors as well as EMI coil sensors 80. By placing DLIR detectors 140 and 150 in the sensor array 30 looking downward to generate DLIR field 1001 a significant reduction in cost is realized since a FLIR 20 camera with its associated lenses is no longer required. The precise configuration of the OLIR detectors 140 and 150 will be discussed further detailed in reference to FIG. 8. As will be discussed in further detailed in reference to FIG. 9, the sensor array 30 may be connected to a processor-based system 130 and a ground positioning satellite system 210. The DLIR detectors 140 and 150 generating the DLIR field 100 would be used to detect buried objects 40 positioned in the ground 60.

Figure 6:
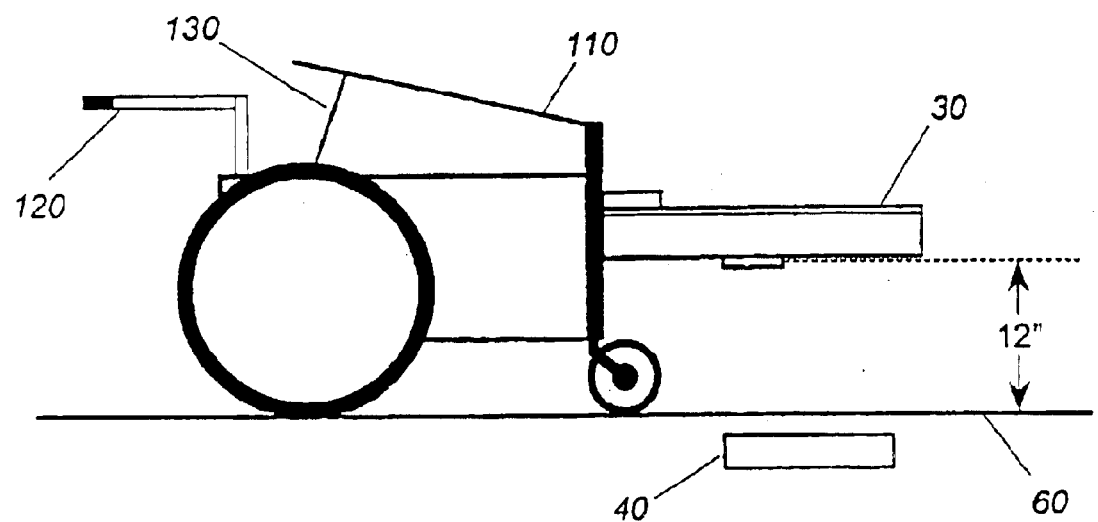
FIG. 6 is a side view diagram of a cart having a sensor array with a DLIR in an example embodiment of the present invention.

FIG. 6 is a side view diagram of a pushcart 110 having a sensor array 30 with DLIR detectors 140 in an example embodiment of the present invention. This push cart 110 is further detailed in CAMPANA et al., "Downward Looking Infrared for Vehicle Mounted Mine Detection", SPIE Aero-Sense Conference 4394: Detection & Remediation Technologies for Mines and Minelike Targets VI, Apr. 16, 2001, incorporated in its entirety herein by reference. The pushcart 110 would be grasped by handles 120 by an operator (not shown). A processor based system 130, such as but not limited to a laptop, would be visible to the operator. A sensor array having at least DLIR detectors 140 would be positioned in front of the pushcart 110 so that the DLIR detectors 140 would be approximately 12 inches above ground 60. As will be discussed in further detailed ahead the sensor array 30 would be utilized to detect buried objects 40 in ground 60, such as land mines. As would be appreciated by one of ordinary skill in the art the distance between the sensor array 30 and ground 60 would vary dependent upon the nature of the sensors utilized.

Figure 9:
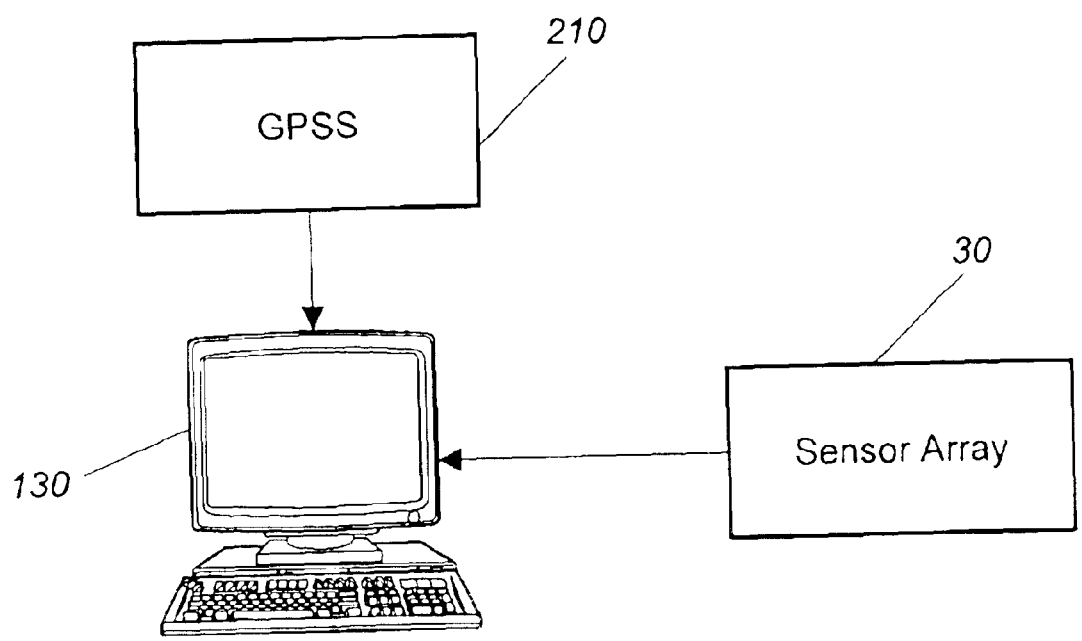
FIG. 9 is a systems diagram of an example embodiment of the present invention.

FIG. 7A is a bottom view of an example embodiment of the sensor array 30 in the present invention. The sensor array 30 would contain a row of GPR 70 sensors, EMI coils 80, and a row of DLIR detectors 140. The sensor array 30 would be mounted as shown in FIGS. 5 and 6. All the foregoing sensors would be connected to the processor based system 130 as illustrated in FIG. 9. In addition all the foregoing sensors would be configured to look down at ground 60 as illustrated in FIGS. 5 and 6.

Figure 7B:
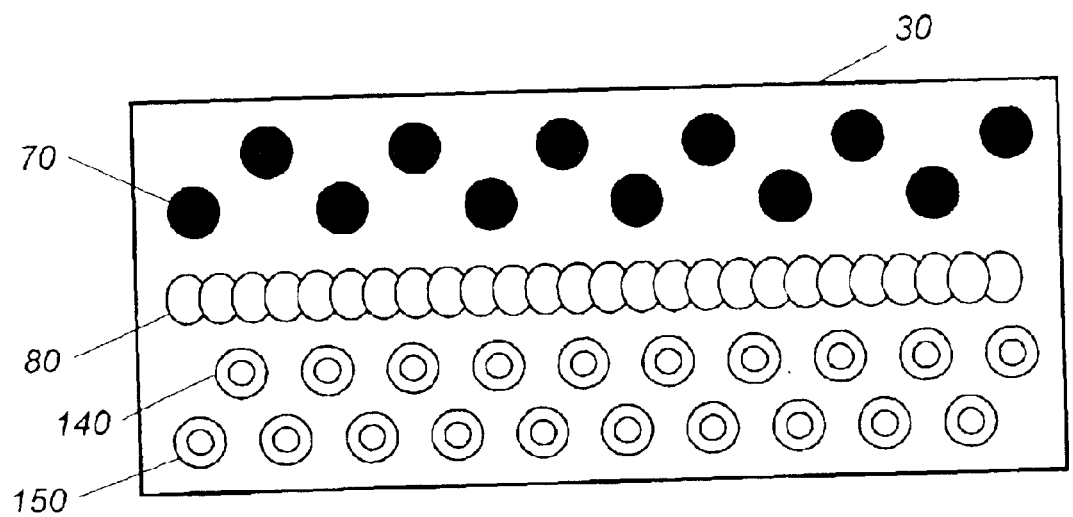
FIG. 7B is a bottom view of an example embodiment of the sensor array in the present invention.
Figure 7C:
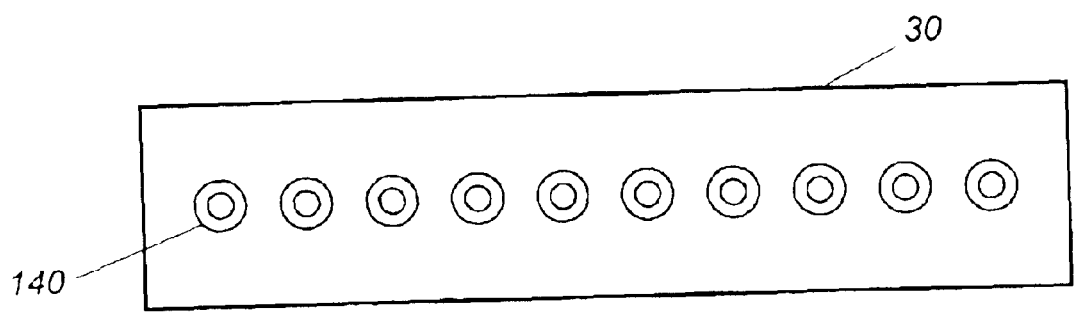
FIG. 7C is a bottom view of an example embodiment of the sensor array in the present invention.
Figure 8:
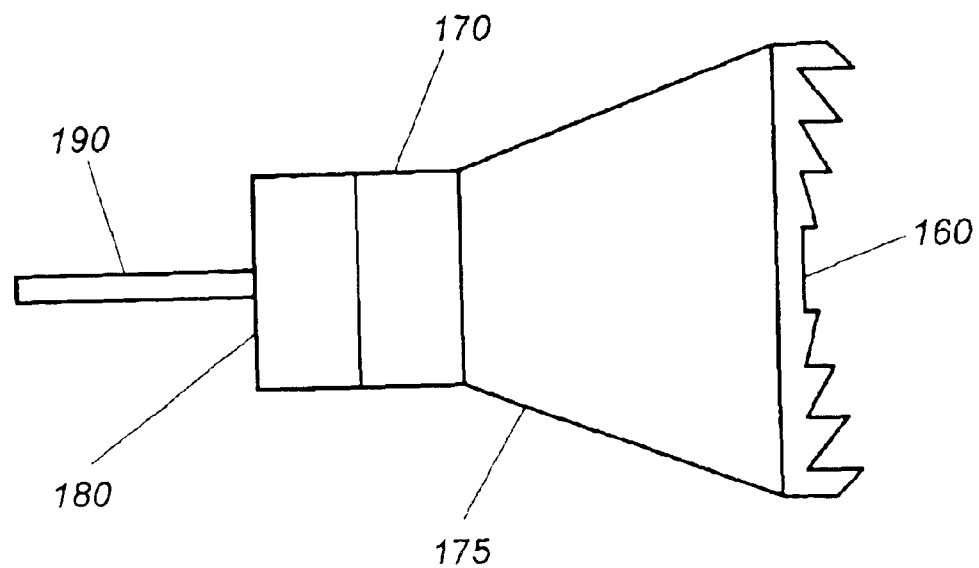
FIG. 8 is a side view of an infrared (IR) sensor utilized in an example embodiment of the present invention.

FIG. 7B is a bottom view of an example embodiment of the sensor array 30 in the present invention. The sensor array 30 illustrated in FIG. 7B is similar to that illustrated in FIG. 7A with the exception that a second row all DLIR detectors 150 is added to FIG. 7B. It should be noted that the DLIR detectors 140 and DLIR detectors 150 are offset from each other in order to provide a more complete image of ground 60. All other features of FIG. 7B remain the same as that of FIG. 7A and will not be discussed further here.

FIG. 7C is a bottom view of an example embodiment of the sensor array 30 in the present invention. Sensor array 30, shown in FIG. 7C, contains only a single row of DLIR detectors 140. However, as with FIG. 7B, multiple rows of the DLIR detectors may be implemented. As discussed in McGOVERN et al. "Analysis of IR Signatures of Surface and Buried Anti-Tank Landmines", SPIE AeroSense Conference 4394: Detection & Remediation Technologies for Mines and Minelike Targets VI, Apr. 16, 2001, incorporated by reference in its entirety herein, infrared detectors alone may be utilized to detect mines. All sensors contained in sensor array 30 would, as previously discussed, be fed into a processor-based system 130 as illustrated in FIG. 9.

FIG. 8 is a side view of an individual infrared (IR) detector 140 utilized in an example embodiment of the present invention. This IR detector 140 utilizes a Fresnel lens 160 held in place with holder 175 to focus images received onto infrared detector 170 which is in turn connected to preamp 180. In turn preamplifier 180 is connected to connection line 190 which is in turn connected to processor-based system 130 as shown in FIG. 9. The Fresnel lens 160 concentrates infrared radiation onto infrared detector 170. The Fresnel lens 160 therefore substitutes for the complex lens system found in FLIR 20 and is substantially less expensive.

FIG. 9 is a systems diagram of an example embodiment of the present invention. All components illustrated in FIG. 9 would be contained in either vehicle 10 or pushcart 110 or attached thereto. As indicated, sensor array 30 would be connected to a processor-based system 130. In addition, a global positioning satellite system (GPSS) 210 or other well-known method of determining location is connected to processor-based system 130. This is required in order for the vehicle 10 or pushcart 110 to precisely identify the location of any buried objects 40 detected.

Figure 10:
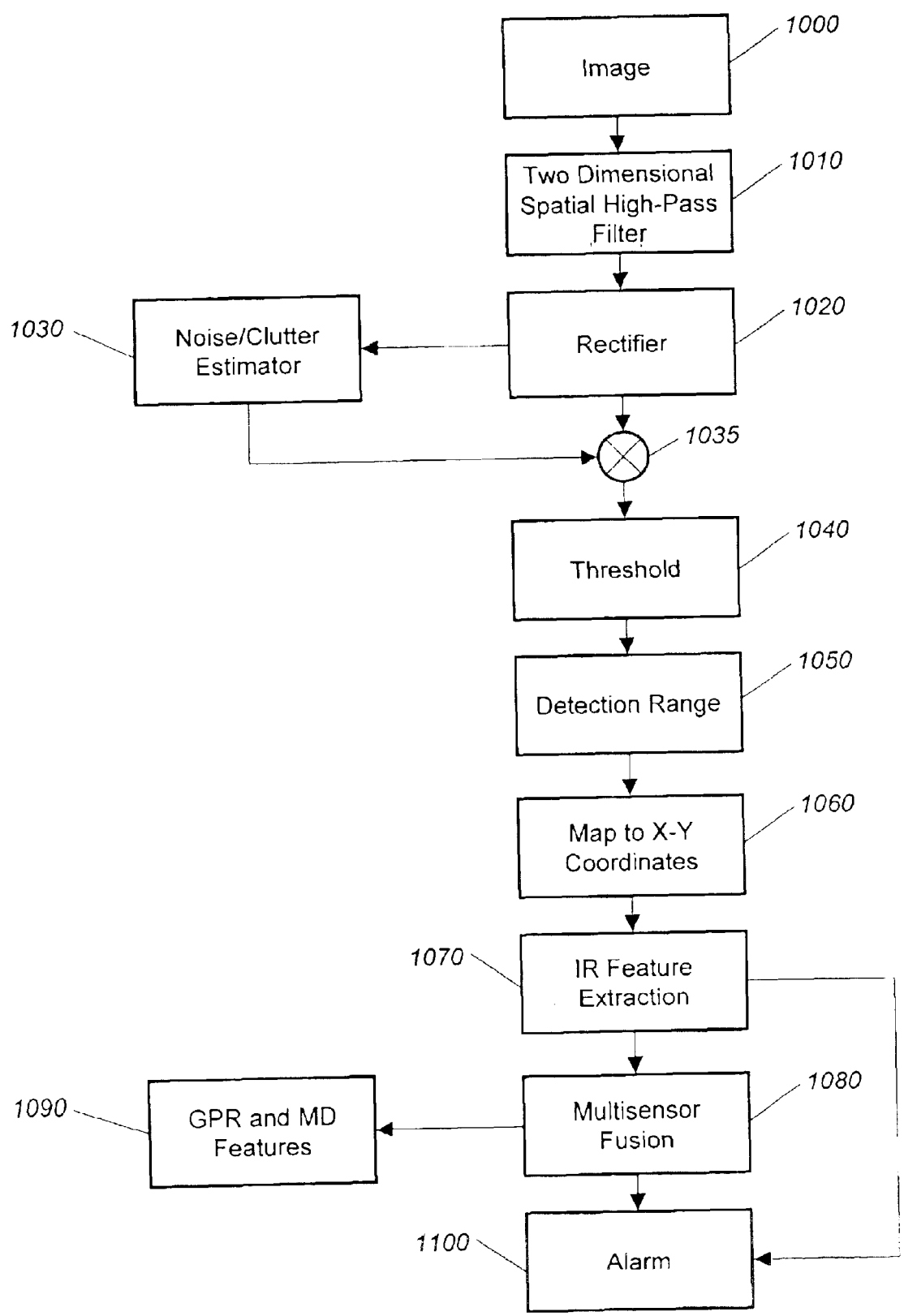
FIG. 10 is a modular flow diagram of an example embodiment of the present invention.

FIG. 10 is a modular configuration flow diagram of the software, firmware, and hardware used in the embodiments of the present invention. The blocks illustrated in FIG. 10 represent modules, code, code segments, commands, firmware, hardware, instructions and data that are executable by a processor-based system(s) and may be written in a programming language, such as, but not limited, to C++.

Still referring to FIG. 10, an image is received by the sensor array 30 in block 1000 and passed to block 1010. In block 1010 the image is passed through a two-dimensional spatial high pass filter. The purpose of the two-dimensional high-pass spatial filter is to optimize the mine signal in relation to sensor noise and scene clutter. The two-dimensional high-pass spatial filter is a zero-mean finite impulse response (FIR) spatial filter, implemented by summing pixels in each of three concentric windows. Thereafter, rectifier 1020 receives the signal so that negative contrast targets can be detected and simultaneously passes the signal to a noise/clutter estimator 1030 and divider 1035. The noise/clutter estimator 1030 attempts to estimate the amount of noise contained within the signal. This is done using the average of the rectified, zero-mean filter output in the region indicated. For Gaussian noise, the rectified average is equal to the standard deviation times sqrt(2/pi). Therefore, the inverse of this scalar is used to adjust the noise estimate. The signal-to-noise ratio can be determined based on the signal received from rectifier 1020 and the noise estimated from the noise/clutter estimator 1030. Thereafter, the signal received from divider 1035 is compared against a predetermined threshold in block 1040. The resulting binary threshold-exceedance map is passed to the detection merge section in block 1050, which first dilates and then shrinks the map down to a single point at the center of the detection cluster. Thereafter, in block 1060 a mapping of the detections from the IR detector 140 coordinates (frame, row, column) to earth coordinates (north, east) is done. In block 1070, detections that fall within a specified capture radius of a prior detection are used to update the position and other metrics associated with that detection.

Still referring to FIG. 10, if only IR detectors 140 are used in sensor array 30 the processing proceeds to block 1100 where an alarm is issued. However, if ground penetrating radar (GPR) and metal detectors (MD) are also used in sensor array 30, as illustrated in FIGS. 7A and 7B, then the output from block 1070 containing the IR feature extractions and block 1090 containing the GPR and MD features are input into the multisensor fusion block 1080. The fusion of data from different sensors may be accomplished as discussed in APONTE et al., "A Bayesian Approach to Multi-Sensor Fusion for Vehicle Mounted Mine Detection", SPIE AeroSense Conference 4394: Detection & Remediation Technologies for Mines and Minelike Targets VI, Apr. 16, 2001, and incorporated herein in its entirety. Thereafter, processing proceeds to block 1100 where an alarm or alarms are generated solely from IR detectors 140 or in some combination of GPR 70 and EMI coils 80.

Using the embodiments of the present invention it is possible detect buried objects, such as anti-tank landmines, with a high degree of accuracy at a significantly reduced cost. By using down looking infrared detectors it is possible to eliminate the need for a costly FLIR camera and reduce clutter generated by reflections from the sky as well as placement errors due to a rough terrain.

While we have shown and described only a few examples herein, it is understood that numerous changes and modifications as known to those skilled in the art could be made to the present invention. An example of such a modification would include utilizing multiple rows of infrared detectors 140 in sensor array 30 depicted in FIG. 7C. Also, any processor-based system 130, including but not limited to, a PC, laptop or Palm computer may be used to receive and process the data and displaying the results. Further, any highly accurate means of determining the vehicle's 10 position on the ground may be used in substitute for the GPSS 210. Therefore, we do not wish to be limited to the details shown and described herein, but intend to cover all such changes and modifications as are encompassed by the scope of the appended claims.

What is claimed is:

1. A device for detecting buried objects, comprising:
   a sensor array having a plurality of downward looking infrared detectors; and
   a processor based system connected to the sensor array to receive and analyze signals received from the downward looking infrared detectors;
   wherein the processor based system receives an image from the sensor array, determines a signal-to-noise ratio for each point in the image, and compares the signal-to-noise ratio with a predetermined threshold to create a binary image indicative of a buried object.

2. The device recited in claim 1, wherein the sensor array comprises:
   a plurality of EMI coils connected to the processor based system; and
   a plurality of ground penetrating radar sensors connected to the processor based system and wherein signals from the EMI coils and the ground penetrating radar sensors are processed.

3. The device recited in claim 2, wherein the processor-based system will combine signals received from the plurality of downward looking infrared detectors, the plurality of EMI coils and the plurality of ground penetrating radar sensors to determine if the buried object is present.

4. The device received in claim 1, wherein a downward looking infrared sensor of the plurality of downward looking infrared detectors comprises:
- a lens to concentrate infrared radiation;
- an infrared detection behind the lens to detect the infrared radiation;
- a preamp connected to the infrared sensor to amplify a signal generated by the infrared sensor; and
- a connection line connected to the preamp and the processor-based system.

5. The device recited in claim 4, wherein the plurality of downward looking infrared detectors are arranged in a row when mounted on the sensor array.

6. The device recited in claim 5, wherein the plurality of downward looking infrared detectors are arranged in a plurality of rows when mounted to the sensor array.

7. The device recited in claim 6, wherein the sensor array is mounted to a vehicle or pushcart.

8. The device recited in claim 7, wherein the buried object is a land mine.

9. A device for detecting buried objects, comprising:
- a sensor array further comprising:
  - a plurality of downward looking infrared detectors;
  - a plurality of EMI coils; and
  - a plurality of ground penetrating radar sensors;
- a processor based system connected to the sensor array to receive and analyze signals received from the plurality of downward looking infrared detectors, the plurality of EMI coils, and the plurality of ground penetrating radar sensors;
- wherein the processor based system receives an image from the sensor array, determines a signal-to-noise ratio for each point in the image, compares the signal-to-noise ratio with a predetermined threshold to create a binary image of a detected buried object, dilates and shrinks the binary image to a single point at the center of the detected buried object.

10. The device recited in claim 9, wherein the processor-based system will combine signals received from the plurality of downward looking infrared detectors, the plurality of EMI coils and the plurality of ground penetrating radar sensors to determine if the buried object is present.

11. The device received in claim 9, wherein a downward looking infrared detector of the plurality of downward looking infrared detector comprises:
- a lens to concentrate infrared radiation;
- an infrared detector behind the lens to detect the infrared radiation;
- a preamp connected to the infrared sensor to amplify a signal generated by the infrared detector; and
- a connection line connected to the preamp and the processor-based system.

12. The device recited in claim 11, wherein the plurality of downward looking infrared detectors are arranged in a row when mounted to the sensor array.

13. The device recited in claim 12, wherein the plurality of downward looking infrared detectors are arranged in a plurality of rows when mounted to the sensor array.

14. The device recited in claim 13, wherein the sensor array is mounted to a vehicle or pushcart.

15. The device recited in claim 14, wherein the buried object is a land mine.

16. A method of detecting buried objects, comprising:
- receiving an image from a plurality of downward looking infrared detectors;
- passing the image through a two-dimensional spatial high pass filter;
- determining the signal to noise ratio for each point in the image;
- comparing the signal to noise ratio to a predetermined threshold; thereby creating a binary image;
- dilating and shrinking the binary image to a single point at the center of each detected object; and
- mapping the single point to earth coordinates.

17. The method recited in claim 16, wherein receiving an image from a plurality of downward looking infrared detectors, further comprises:
- receiving a plurality of signals from the plurality of downward looking infrared detectors;
- receiving a plurality of signals from a plurality of ground penetrating radar sensors; and
- receiving a plurality of signals from a plurality of EMI coils.

18. A method recited in claim 17, further comprising:
- extracting features from the plurality of signals from the plurality of downward looking infrared detectors;
- extracting features from the plurality of signals from the plurality of ground penetrating radar sensors; and
- extracting features from the plurality of signals from the plurality of EMI coils.

19. The method recited in claim 18, further comprising:
- fusing the extracted features from the plurality of signals from the plurality of downward looking infrared detectors, the extracted features from the plurality of signals from the plurality of ground penetrating radar sensors, and the extracted features from the plurality of signals from the plurality of EMI coils to generate alarms of the presence of a buried object.

* * * * *

UNITED STATES PATENT AND TRADEMARK OFFICE
CERTIFICATE OF CORRECTION

PATENT NO. : 6,838,671 B2
DATED : January 4, 2005
INVENTOR(S) : Stephen B. Campana and Conrad W. Terrill It is certified that error appears in the above-identified patent and that said Letters Patent is hereby corrected as shown below:

<u>Title page,</u>
Item [12], United States Patent, change "Comana et al." to -- Campana et al. --
Item [75], Inventors, change "Stephen B. Compana," to -- Stephen B. Campana, --.

Signed and Sealed this

Twenty-fourth Day of May, 2005

JON W. DUDAS
*Director of the United States Patent and Trademark Office*